(12) United States Patent
Goddard

(10) Patent No.: US 7,451,784 B2
(45) Date of Patent: Nov. 18, 2008

(54) CORRUGATED PIPE WITH PERFORATION PROTECTING COVER

(75) Inventor: James B. Goddard, Powell, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 277 days.

(21) Appl. No.: 11/041,271

(22) Filed: Jan. 25, 2005

(65) Prior Publication Data

US 2006/0162799 A1 Jul. 27, 2006

(51) Int. Cl.
  *F16L 11/00* (2006.01)
(52) U.S. Cl. .................. 138/110; 138/105; 138/121; 405/48; 405/49
(58) Field of Classification Search .......... 138/121, 138/122, 110, 105; 405/48, 49
  See application file for complete search history.

(56) References Cited

U.S. PATENT DOCUMENTS

| | | | | |
|---|---|---|---|---|
| 3,566,607 A | * | 3/1971 | Sixt | 405/49 |
| 3,695,643 A | * | 10/1972 | Schmunk | 285/133.3 |
| 3,699,684 A | * | 10/1972 | Sixt | 405/49 |
| 3,899,198 A | * | 8/1975 | Maroschak | 285/27 |
| 3,976,578 A | * | 8/1976 | Beane | 210/484 |
| 4,721,408 A | * | 1/1988 | Hewlett | 405/48 |
| 4,756,339 A | * | 7/1988 | Buluschek | 138/115 |
| 4,930,936 A | * | 6/1990 | Hegler et al. | 405/49 |
| 4,995,759 A | * | 2/1991 | Plowman et al. | 405/43 |
| 5,890,838 A | * | 4/1999 | Moore et al. | 405/49 |
| 6,076,992 A | * | 6/2000 | Fukui et al. | 405/43 |
| 6,120,209 A | * | 9/2000 | Evans | 405/43 |
| 6,461,078 B1 | * | 10/2002 | Presby | 405/49 |
| 6,679,653 B1 | * | 1/2004 | DiTullio | 405/49 |
| 6,854,925 B2 | * | 2/2005 | DiTullio | 405/49 |
| 7,314,066 B2 | * | 1/2008 | Castillo et al. | 138/114 |
| 2003/0228194 A1 | * | 12/2003 | Ring et al. | 405/46 |
| 2004/0253054 A1 | * | 12/2004 | Atchley | 405/36 |

FOREIGN PATENT DOCUMENTS

WO  WO 03/042604 A1 * 5/2003

* cited by examiner

*Primary Examiner*—James F Hook
(74) *Attorney, Agent, or Firm*—Finnegan, Henderson, Farabow, Garrett & Dunner, L.L.P.

(57) ABSTRACT

A pipe having an axially extending bore is defined by a corrugated outer wall having alternating, axially-adjacent, annular crests and valleys. The wall of the pipe has a hole disposed in a valley which provides fluid communication between the bore and the outside. The pipe also has a cover which extends between and is attached to axially adjacent crests. The cover is disposed over the hole to prevent material in which the pipe may be disposed from obstructing the hole and permitting fluid flow through the hole.

19 Claims, 5 Drawing Sheets

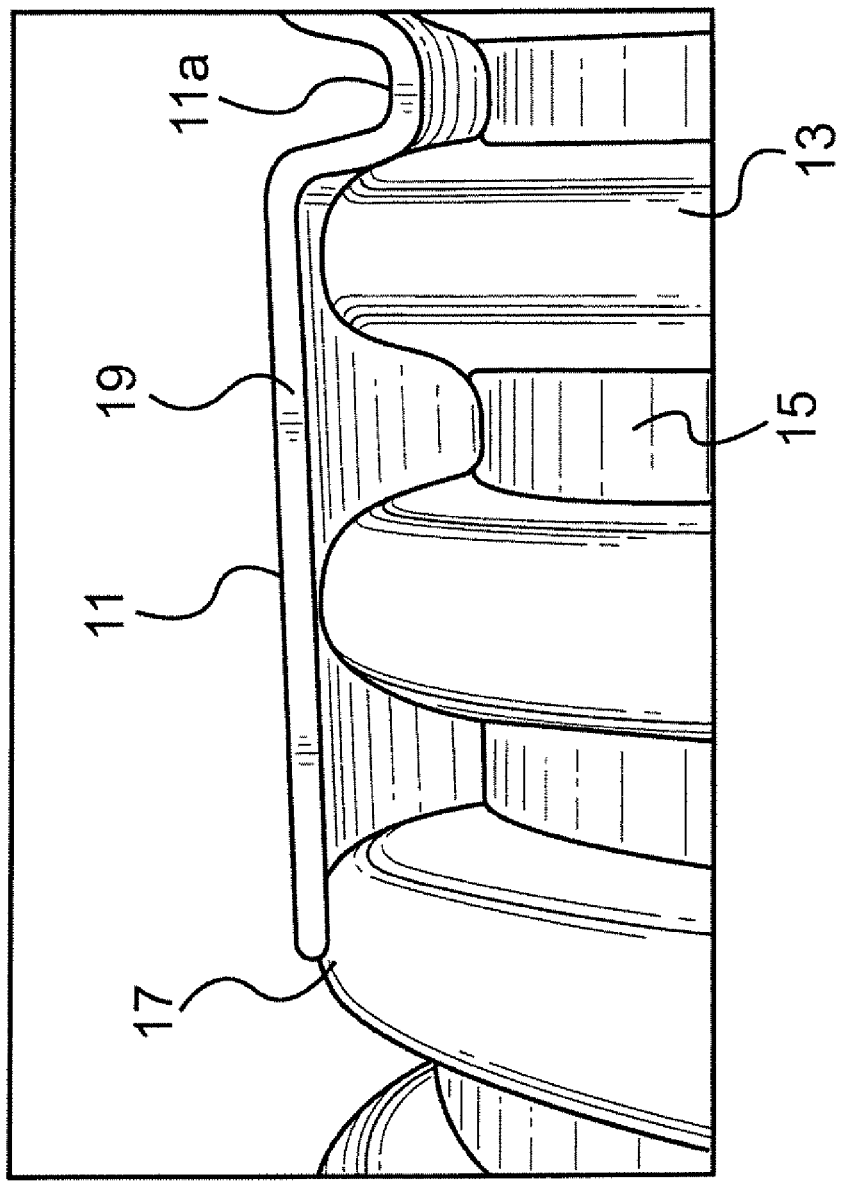

CORRUGATED PIPE WITH PERFORATION PROTECTING COVER

DESCRIPTION OF THE INVENTION

1. Field of the Invention

This invention relates generally to corrugated pipe having a cover for protecting perforations in the pipe, and more particularly, to pipes having perforations that are placed in the top half of the pipe.

2. Background of the Invention

A variety of applications utilize pipes with perforations. In a number of these applications, the perforations must be protected.

In certain subsurface drainage applications, water or chemical contaminants must be removed from the soil and drained into a pipe, but once in the pipe cannot escape into other soil areas. In such applications the lower half of the pipe must not be perforated and the pipe joints must be watertight, but the upper half must be perforated to receive the water or contaminants. In those cases, the perforations in the top half of the pipe may need to be protected from plugging by the surrounding soil or backfill.

In certain municipal waste landfill or chemical waste landfill applications, leachate must be removed for treatment, but in the process of removal, can not leak into other areas. In this case pipe perforated only in the top half is required, and the perforations must be protected from plugging or clogging by the backfill or soil above the pipe.

In certain processes to remove contaminants from soil, particularly volatile hydrocarbons, air is passed through the soil through perforated underground pipes. Air distribution is ideally equally distributed through the soil. Perforations in the top half of the pipe of varying perforation patterns are used to facilitate more even distribution.

In certain mining applications, mineral ore must be oxidized when it is extracted. Corrugated polyethylene pipe is commonly used to facilitate such ore oxidation. Typically, the pipe is installed, usually in a grid, and then a pile of ore is built over the pipe. This arrangement allows air to be distributed through the pipe to the surrounding pile of mineral ore to achieve the oxidation.

Air is distributed through the pipe to the surrounding ore through perforations or holes in the wall of the pipe that allows air entering or in the pipe to reach the surrounding ore to facilitate oxidation. However, because the pipes are often disposed in piles of ore, the sediment from the ore pile may plug the holes. In addition, water may plug holes located along the bottom of the pipe.

In certain applications where commodity grains are stored it is necessary to provide aeration to the storage piles to prevent spoilage. Perforated pipe must distribute air uniformly through the piles without plugging of the perforations by the grains.

It would therefore be advantageous to provide a corrugated pipe with a means for preventing material from obstructing perforations in the pipe.

SUMMARY OF THE INVENTION

Embodiments of the present invention are directed to a pipe having an axially extending bore which is defined by a corrugated outer wall having alternating, axially-adjacent, annular crests and valleys. The wall of the pipe has a hole disposed in a valley which provides fluid communication between the bore and the outside. The pipe also has a cover which extends between and is attached to axially adjacent crests and is disposed over the hole to prevent material in which the pipe may be disposed from obstructing the hole or fluid flow through the hole.

In an exemplary embodiment, the wall has a plurality of holes grouped together in a single valley and the cover is sized and disposed to protect the group of holes. Embodiments of the invention also include a plurality of groups of holes, each group being disposed in a valley axially or annularly spaced from the other groups of holes, including a plurality of covers, each sized and disposed to protect a respective group of holes.

In an exemplary embodiment, the pipe and the cover are made of polyethylene, and the cover may be attached to the pipe by a variety of methods including welding, and fixing with an adhesive.

Another embodiment of the invention is directed to a method of oxidizing mineral ore. The method includes disposing a pipe having a hole and a cover into a pile of ore, and pumping air through the pipe in a manner that permits air to pass through the hole in the pipe and into the ore pile.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a side view of the pipe illustrating the attachment of the cover to the pipe.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
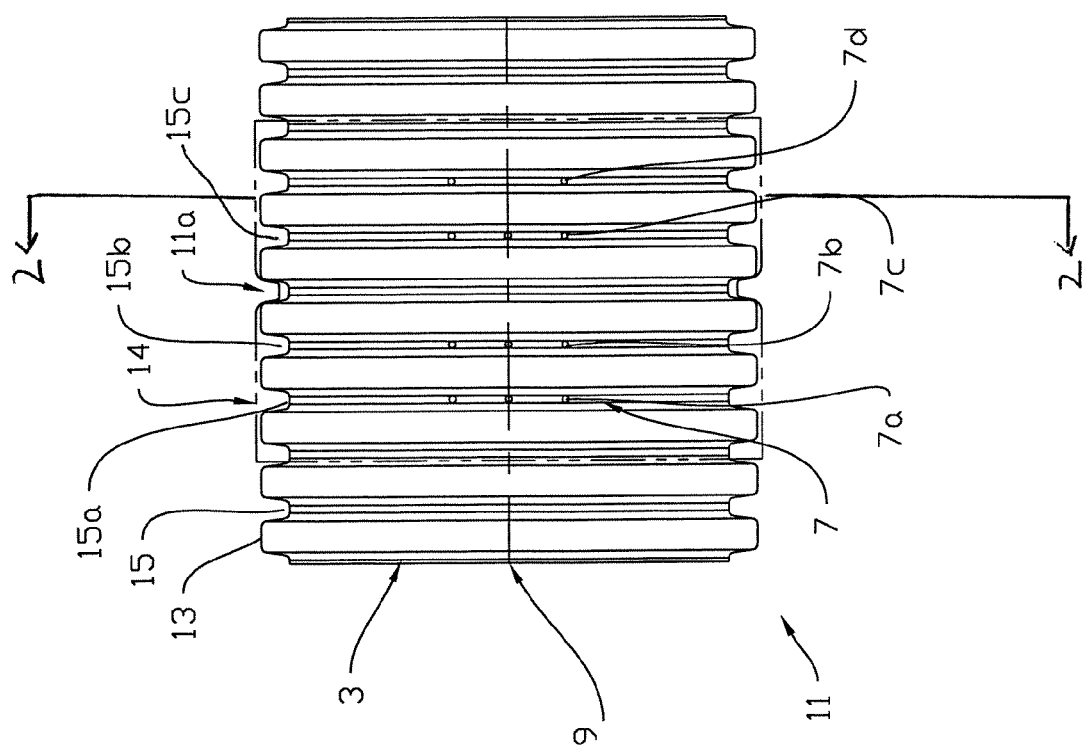
FIG. 1 is a top view of the pipe of the present invention.

FIG. 1 illustrates a top view of the pipe of the present invention. Pipe 1, has an elongated bore 5 and a corrugated outer wall 3. Corrugated outer wall 3 has alternating, axially-adjacent, annular crests 13 and valleys 15. The pipe is provided with perforations or holes 7 in outer wall 3 providing fluid communication with the bore 5. Holes 7, as depicted in the drawings, may alternatively be slits, breathing membranes or any equivalent thereof.

Holes 7 are located in valley 15 of corrugated outer wall 3. Holes 7 may be located in the bottom of valley 15, or along the sides of the valley 15. In an exemplary embodiment, holes 7 are on the top portion of the pipe 1, but holes 7 may be spaced along the entire circumference of the pipe 1.

Outer wall 3 preferably has a plurality of holes grouped together in a single valley 15. Multiple groups of holes are shown as 7a, 7b, 7c, and 7d. The groups of holes may be located in adjacent or remote valleys 15. For example, holes 7a are in a valley 15a, adjacent to holes 7b in valley 15b, and holes 7b in valley 15b are axially spaced from holes 7c in valley 15c. The holes could be in every other valley or every third valley, although that would increase the cover size or require multiple covers.

The present embodiment has four rows of holes 7a, 7b, 7c, and 7d in which three of the rows (7a, 7b, and 7c) have three holes and one of the rows (7d) has two holes. Additionally the rows with three holes (7a, 7b, and 7c) are shown with one hole placed at the diameter 9 of the pipe and the two additional holes being equidistant from the diameter 9. The row with two holes (7d) is shown with the two holes being equidistant from the diameter 9. However, any appropriate arrangement of holes may be employed.

A cover 11 is placed over the holes 7a, 7b, 7c, and 7d. Cover 11 preferably has an area and shape that is at least sufficient to cover valleys 15 which contain holes 7. Cover 11 is preferably semi-circular to compliment the profile of the pipe 1, and has a precise fit to the outside of pipe 1. The cover 11 is placed in such a way that there is sufficient space between the cover 11 and the valley 15 floor so as to allow for fluid flow between the holes 7 and the outside environment.

Cover 11 has an annularly extending centering ridge 11a which is disposed in one of the valleys 15. Centering ridge 11a allows for easy placement of cover 11 so that it is evenly distributed over holes 7. The centering ridge is shown in greater detail in FIG. 3.

In the preferred embodiment of the invention, pipe 1, outer wall 3, and cover 11 comprise a plastic such as high density polyethylene (HDPE). Alternatively, other materials may be used, including other polyethylene (PE), polypropylene (PP), polyvinyl chloride (PVC), and other plastics or composite materials. Pipe 1 and cover 11 are preferably made of the same material so that they have the same density and melt properties and can be readily attached by welding or solvent cement. However, pipe 1 and cover 11 need not be same the material but should be compatible both for forming the covered pipe and in use. This facilitates welding cover 11 onto pipe 1.

Figure 2:
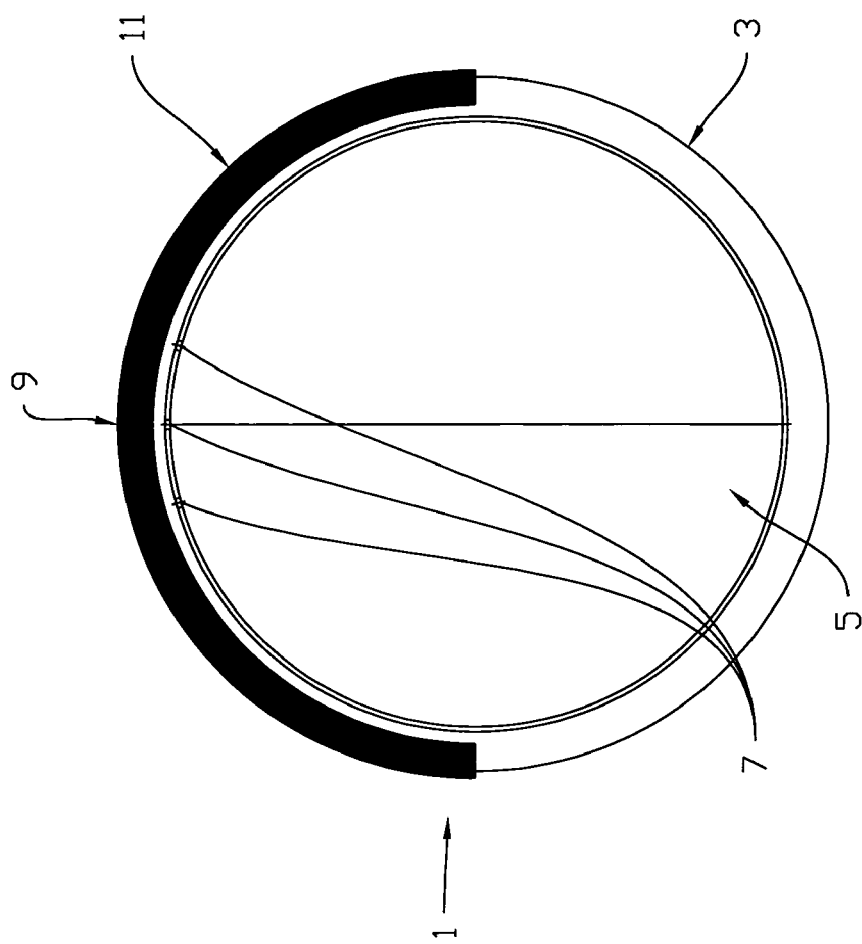
FIG. 2 is a cross sectional view of the pipe of the present invention along line 2-2 of FIG. 1.

FIG. 2 illustrates a cross sectional view along line 2-2 of FIG. 1 of the pipe of the present invention. Cover 11 is shown as having a diameter slightly larger than pipe 1. Cover 11 is also shown as extending over the circumference of the top half of pipe 1.

In the present embodiment, one hole 7 is on the diameter of pipe 1 and the other holes 7 are disposed on opposite sides of the diameter 9 and are coaxial with respective radii of bore 5. The holes 7 which are on either side of the diameter 9 are equidistant from diameter 9. The placement of holes 7 will depend in part on the number of holes 7.

The present invention contemplates pipes having a wide variety of dimensions. An exemplary embodiment of pipe 1 has a diameter of ten inches. Likewise, the holes may be of a variety of diameters. An exemplary embodiment of the pipe 1 has holes 7 having diameters of four millimeters.

Figure 3:
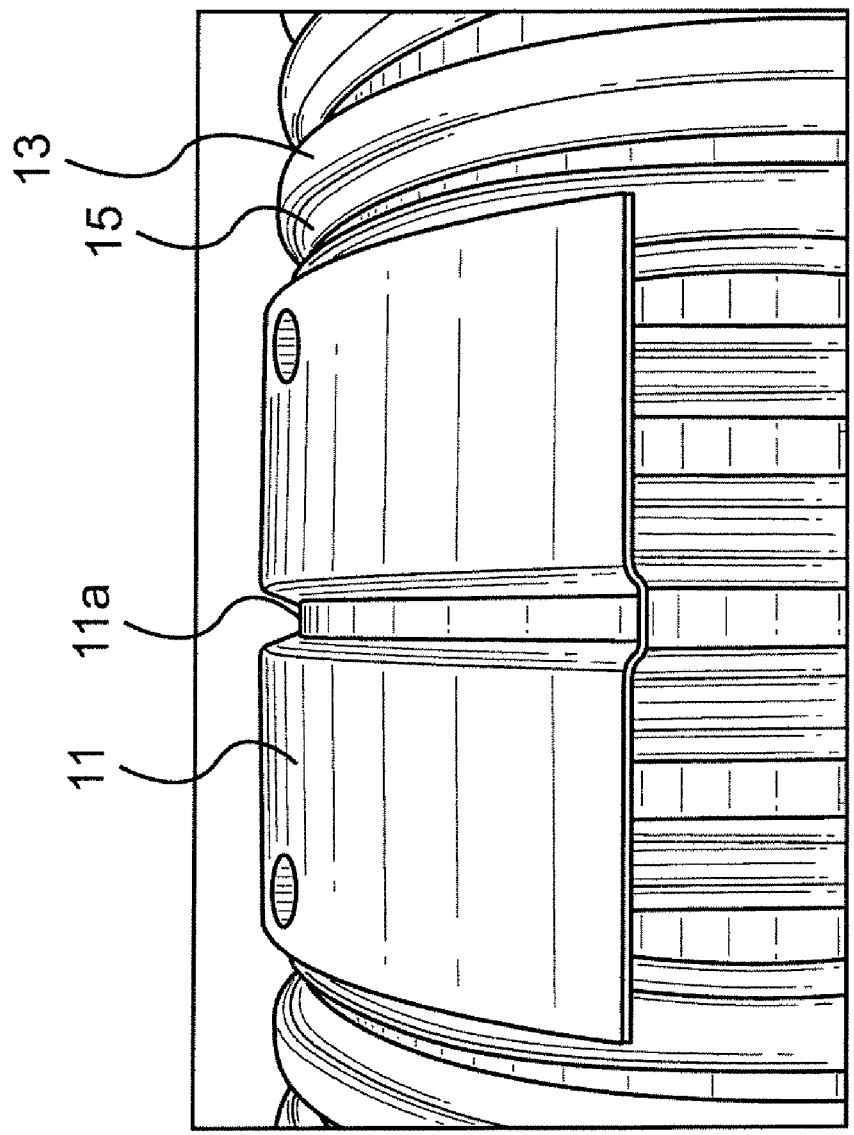
FIG. 3 is the side view of the pipe of the present invention illustrating the centering ridge of the cover.

FIG. 3 shows a side view of the pipe 1, and more particularly centering ridge 11a of cover 11. Centering ridge 11a fits into a valley 15 of the corrugations of the pipe 1. When cover 11 is placed on pipe 1, centering ridge 11a ensures proper placement of cover 11 over holes 7.

In an exemplary embodiment centering ridge 11a is in the center of cover 11. While a ridge is shown in FIG. 3, the present invention also contemplates other mechanisms to center cover 11 over holes 7, such as a projection placed on the inside of cover 11 that would engage valley 15.

Figure 4:
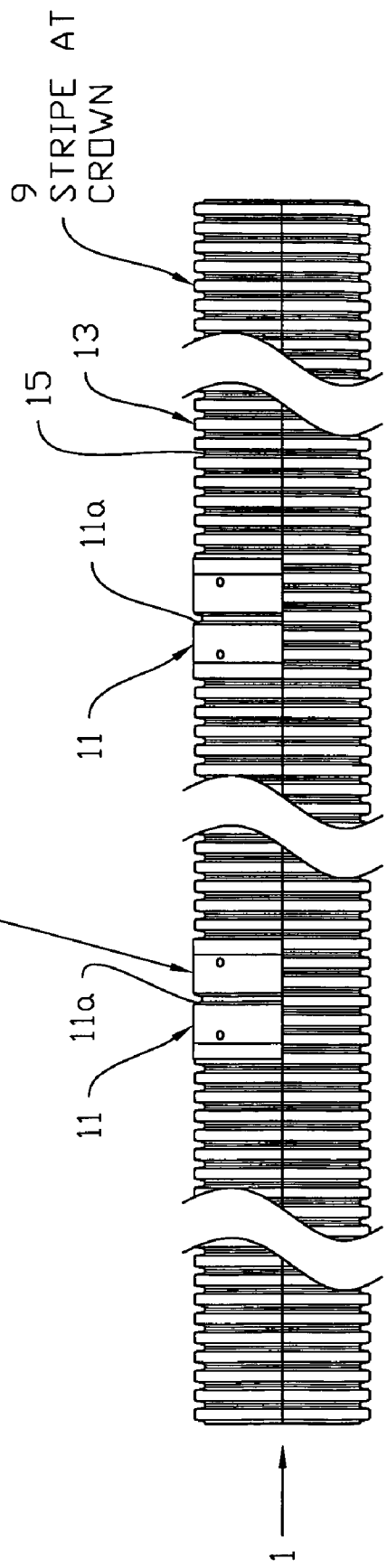
FIG. 4 is a side view of the pipe showing multiple covers.

FIG. 4 shows a side view of pipe 1. Pipe 1 may have a plurality of covers 11 placed over a plurality of groups of holes 7 (not shown in FIG. 4). The plurality of groups of holes are located in axially spaced valleys 15. Covers 11 may be located at any convenient distance apart. The spacing of the plurality of groups of holes and the number of holes in each group is variable among sections of pipe 1. For aeration applications, the placement and number of holes used is based on the distance from the source of air (not shown) that is blowing air into the pipe. The farther away the section of pipe is from the source of air, the more holes it will need to provide generally uniform air flow through pipe 1 along its length. In the embodiment of FIG. 4, the covers are spaced at twenty feet intervals.

According to the current invention, pipe 1 may be used in mining applications, such as the leach process form of mining. In such applications, pipe 1 is disposed in a pile of mineral ore (not shown), such as copper or gold ore. Air is then pumped through pipe 1 in a manner that permits air to pass through holes 7 in pipe 1 into the ore pile. Cover 11 allows the air to be distributed through the ore, while preventing holes 7 from being obstructed. Therefore, fluid flow is not restricted, and the reaction of the ore with the leachate is more efficient.

FIG. 5 shows the attachment of cover 11 onto pipe 1. When cover 11 is placed over pipe 1, cover 11 is in contact with crests 13 of the corrugations. Centering ridge 11a is fit into a valley 15 of the corrugations of the pipe 1 where there are no holes. Otherwise, cover 11 will not project into the valleys 15 of the corrugations of pipe 1. Therefore, there is a gap 19 between cover 11 and valleys 15 of the corrugations of pipe 1. Gap 19 allows air communication from pipe 1 and the outside environment.

Cover 11 may be attached to pipe 1 in any manner that is convenient. Because cover 11 is shaped so as to fit precisely with pipe 1, attachment is relatively simple. For example, cover 11 may be welded to adjacent crests 13 of the pipe. Cover 11 may also be fixed to adjacent crests 13 of pipe 1 with an adhesive, strapped to pipe 1, or fused to pipe 1. In FIG. 5 cover 11 is attached by welding 17 cover 11 onto a crest 13 of pipe 1 at the edge of the cover 11. However, welding 17 can be at any location.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An elongated pipe comprising:
   a corrugated outer wall having alternating, axially-adjacent, annular crests and valleys and having an axially-extending bore, the corrugated outer wall comprising:
      a fluid-impermeable valley; and
      two porous valleys disposed on opposing sides of the fluid-impermeable valley, and having a plurality of through-holes disposed therein; and
   a semi-cylindrical, fluid-impermeable cover comprising:
      a radially, inward-extending ridge disposed near an axial midpoint of the cover; and
      two uncorrugated portions extending away from opposing sides of the radially, inward-extending ridge;

wherein the radially, inward-extending ridge engages the fluid-impermeable valley of the corrugated outer wall such that the two uncorrugated portions extend over at least the two porous valleys, thereby forming an open flowpath between the plurality of through-holes disposed in the porous valleys and backfill surrounding the corrugated outer wall so as to prevent the backfill from obstructing the plurality of through-holes.

2. The pipe of claim 1 wherein the outer wall has a plurality of groups of holes, each group being disposed in a valley axially spaced from the other groups of holes, and including a plurality of covers, each sized and disposed to protect a respective group of holes.

3. The pipe of claim 1 wherein the pipe is made of plastic.

4. The pipe of claim 3 wherein the plastic is polyethylene.

5. The pipe of claim 1 wherein the cover is made of the same material as the pipe.

6. The pipe of claim 1 wherein the cover is welded to the adjacent crests of the pipe.

7. The pipe of claim 1 wherein the cover is fixed to the adjacent crests of the pipe with an adhesive.

8. A method of oxidizing mineral ore comprising the steps of:
disposing the pipe of claim 1 into a pile of such ore, and
pumping air through the pipe in a manner that permits air to pass through the hole in the pipe and into the ore pile.

9. The method of claim 8, further comprising providing a source of air distribution, providing a first set of holes for distributing air between the pipe and the ore pile at a first air distribution rate, providing a second set of holes for distributing air between the pipe and the ore pile at a second rate that is greater than the first air distribution rate, the first set of holes being located closer to the source of air distribution than the second set of holes.

10. A distribution system comprising:
a corrugated pipe configured to be buried within a material, and having a plurality of annular crests and valleys and a passage, the corrugated pipe comprising:
a fluid-impermeable valley; and
two porous valleys disposed on opposing sides of the fluid-impermeable valley, and having a plurality of perforations for distributing a substance between the passage and the material; and
a semi-cylindrical, fluid-impermeable cover comprising:
a radially, inward-extending ridge disposed near an axial midpoint of the cover and fitted within the fluid-impermeable valley of the corrugated outer wall, and
two uncorrugated portions extending away from opposing sides of the radially, inward-extending ridge;
wherein the two uncorrugated portions extend over at least the two porous valleys, thereby forming an open flow path between the plurality of perforations and the material in which the corrugated pipe is buried so as to prevent the material from obstructing the plurality of perforations when the corrugated pipe is buried within the material.

11. The distribution system of claim 10, wherein the material is soil and the substance is liquid drained from the soil.

12. The distribution system of claim 10, wherein the material is landfill and the substance is leachate from the landfill.

13. The distribution system of claim 10, wherein the material is capable of being oxidized and the substance is air.

14. The distribution system of claim 10, wherein the material is a commodity and the substance is air.

15. The distribution system of claim 10, wherein the cover is welded to adjacent crests of the corrugated pipe.

16. The distribution system of claim 10, wherein the material is ore and the substance is air, said distribution system further comprising:
a source of air distribution;
a first set of holes configured to distribute air between the pipe and the ore at a first air distribution rate; and
a second set of holes configured to distribute air between the pipe and the ore at a second rate that is greater than the first air distribution rate;
wherein the first set of holes is located closer to the source of air distribution than the second set of holes.

17. A corrugated pipe assembly configured to be buried within a material, the corrugated pipe assembly comprising:
a corrugated pipe having a plurality of annular crests and valleys, and a passageway, the corrugated pipe comprising:
a plurality of fluid-impermeable valleys; and
two porous valleys disposed on opposing sides of each of the plurality of fluid-impermeable valleys, and having a group of perforations disposed in each of the porous valleys; and
a plurality of semi-cylindrical, fluid-impermeable covers, each cover comprising:
a radially, inward-extending ridge disposed near an axial midpoint of the cover; and
two uncorrugated portions extending away from opposing sides of the radially, inward-extending ridge;
wherein the ridge of each cover engages one of the plurality of fluid-impermeable valleys, thereby maintaining an open flowpath for distributing a substance between the material and the passageway via the groups of perforations.

18. The corrugated pipe assembly of claim 17, wherein each of the semi-cylindrical, fluid-impermeable covers extends radially over a top half of the corrugated pipe, and axially over at least three valleys.

19. The corrugated pipe assembly of claim 17, wherein the plurality of semi-cylindrical, fluid-impermeable covers are axially spaced apart from each other by about 20 feet.

* * * * *